(12) United States Patent
Henry et al.

(10) Patent No.: US 6,985,999 B2
(45) Date of Patent: Jan. 10, 2006

(54) MICROPROCESSOR AND METHOD FOR UTILIZING DISPARITY BETWEEN BUS CLOCK AND CORE CLOCK FREQUENCIES TO PRIORITIZE CACHE LINE FILL BUS ACCESS REQUESTS

(75) Inventors: G. Glenn Henry, Austin, TX (US);
Rodney E. Hooker, Austin, TX (US)

(73) Assignee: IP-First, LLC, Fremont, CA (US)

( * ) Notice: Subject to any disclaimer, the term of this patent is extended or adjusted under 35 U.S.C. 154(b) by 466 days.

(21) Appl. No.: 10/274,842

(22) Filed: Oct. 18, 2002

(65) Prior Publication Data
US 2003/0093636 A1   May 15, 2003

Related U.S. Application Data

(60) Provisional application No. 60/345,458, filed on Oct. 23, 2001.

(51) Int. Cl.
*G06F 12/00* (2006.01)

(52) U.S. Cl. .................. 711/118; 711/113; 711/118; 711/121; 711/125; 711/126; 711/137; 711/154; 710/39; 710/40; 710/112; 710/113; 710/240; 710/241; 710/244

(58) Field of Classification Search ................ 711/113, 711/118–144, 210, 213–215; 710/39–40, 710/112–113, 240–244
See application file for complete search history.

(56) References Cited

U.S. PATENT DOCUMENTS

| | | | | |
|---|---|---|---|---|
| 5,333,296 A | * | 7/1994 | Bouchard et al. | ........... 711/171 |
| 5,694,533 A | * | 12/1997 | Richards et al. | ............ 345/420 |
| 5,860,158 A | * | 1/1999 | Pai et al. | ..................... 711/118 |
| 6,026,459 A | * | 2/2000 | Huppenthal | ................. 710/116 |
| 6,148,372 A | * | 11/2000 | Mehrotra et al. | ........... 711/122 |
| 6,311,285 B1 | * | 10/2001 | Rodriguez et al. | .......... 713/401 |

* cited by examiner

*Primary Examiner*—Donald Sparks
*Assistant Examiner*—Hashem Farrokh
(74) *Attorney, Agent, or Firm*—E. Alan Davis; James W. Huffman

(57) ABSTRACT

A microprocessor prioritizes cache line fill requests according to request type rather than issuing the requests in program order. In one embodiment, the request types include blocking accesses at highest priority, non-blocking page table walk accesses at medium priority, and non-blocking store allocation and prefetch accesses at lowest priority. The microprocessor takes advantage of the fact that the core logic clock frequency is a multiple of the processor bus clock frequency, typically by an order of magnitude. The microprocessor accumulates the various requests generated by the core logic each core clock cycle during a bus clock cycle. The microprocessor waits until the last core clock cycle before the next bus clock cycle to prioritize the accumulated requests and issues the highest priority request on the processor bus.

34 Claims, 4 Drawing Sheets

Microprocessor Operation

*Microprocessor*

Control Logic

*Microprocessor Operation*

Microprocessor Operation Example

MICROPROCESSOR AND METHOD FOR UTILIZING DISPARITY BETWEEN BUS CLOCK AND CORE CLOCK FREQUENCIES TO PRIORITIZE CACHE LINE FILL BUS ACCESS REQUESTS

This application claims priority based on U.S. Provisional Application Ser. No. 60/345,458, filed Oct. 23, 2001, entitled CONTINUOUS FILL PRIORITIZATION.

FIELD OF THE INVENTION

This invention relates in general to the field of cache memories in microprocessors, and particularly cache memories in microprocessors having disparate core clock and bus clock frequencies.

BACKGROUND OF THE INVENTION

Contemporary computer systems commonly include a microprocessor. The microprocessor is coupled to the other components of the system by a processor bus and the microprocessor communicates with the other devices over the processor bus, such as by transferring data.

Typically, the processor bus operates at one clock frequency, and the circuitry inside the microprocessor operates internally at a much higher clock frequency. The internal microprocessor clock frequency is commonly referred to as the core clock frequency. For example, the processor bus clock frequency may be 100 MHz, whereas the core clock frequency may be 1 GHz.

It is common for the core clock frequency to be a multiple of the bus clock frequency. In the example above, the multiple, or clock multiplier, is 10. It is also common for the multiple to be a fraction, such as 15½. Regardless of their values, the core clock frequency is typically an order of magnitude greater than the bus clock frequency. The clock multiplier may be programmed into the microprocessor during manufacture, or may be programmable.

Microprocessors typically include a cache memory. A cache memory is a relatively small memory inside the processor that stores a subset of the data in the system memory in order to reduce data access time, since accesses to the cache memory are much faster than to the system memory. Caches store data in cache lines. A typical cache line size is 32 bytes, and cache lines are arranged on cache line size memory address boundaries. When an instruction attempts to read or write data, the microprocessor checks first in the cache to see if the cache line implicated by the data address is present in the cache. If so, the instruction reads the data from or writes the data to the cache. Otherwise, the cache generates a bus request to read the data from or write the data to system memory on the processor bus.

Although the microprocessor may internally generate one or more bus requests each core clock cycle, the microprocessor can only issue one bus request on the external processor bus each bus clock cycle. Hence, during a bus clock cycle the microprocessor may internally generate many requests, depending upon the instruction sequence and the clock multiplier value. However, the microprocessor can only issue on the processor bus one of the many bus requests each bus clock cycle. The remaining bus requests must wait until the next bus clock cycle at which time the microprocessor can issue another request.

The conventional approach is to issue internally generated requests on the processor bus in program order, that is, in the order the program executing on the microprocessor generates the requests. However, the conventional approach fails to recognize that the order in which the program generates bus requests may be different from the order of urgency of the pending requests. That is, the data missing in the cache associated with one bus request may be more urgently needed than the data missing in the cache associated with a different bus request.

Therefore, what is needed is a microprocessor and method for exploiting the disparity between core clock and bus clock frequencies to issue more urgent bus requests before less urgent bus requests.

SUMMARY

The present invention provides a microprocessor that accumulates bus requests generated at core clock rates and prioritizes the bus requests according to the request type and issues the highest priority request at each bus clock. Accordingly, in attainment of the aforementioned object, it is a feature of the present invention to provide a microprocessor. The microprocessor is coupled to a bus for transferring data from a memory to the microprocessor. The bus operates at a first clock frequency, and the microprocessor operates at a second clock frequency. The second clock frequency is N times the first clock frequency. The microprocessor includes a cache memory that generates requests to read data from the memory on the bus. The requests include a plurality of access types. The microprocessor also includes control logic, coupled to the cache memory, which receives and accumulates the requests from the cache memory for approximately N cycles of the second clock frequency. The control logic prioritizes the accumulated requests according to the plurality of access types. The microprocessor also includes a bus interface unit, coupled to the control logic, which receives from the control logic after the approximately N cycles of the second clock frequency a highest priority one of the prioritized requests. The plurality of access types includes a blocking access type request. The control logic prioritizes blocking access type requests as highest priority of the access types.

In another aspect, it is a feature of the present invention to provide a data cache. The data cache is in a microprocessor coupled to a system memory by a bus. The microprocessor core logic operates according to a core clock. The bus operates according to a bus clock. The data cache includes a request queue that stores a plurality of requests to fill a cache line from the system memory on the bus. The requests include a plurality of types. The data cache also includes request accumulation logic, coupled to the request queue, which stores the plurality of requests into the request queue in an order received during core clock cycles. The data cache also includes prioritization logic, coupled to the request queue, which prioritizes the plurality of requests based on the plurality of types during a core clock cycle just prior to a next bus clock cycle. The data cache also includes bus request issue logic, coupled to the request queue, which removes from the request queue a highest priority of the plurality of requests prioritized by the prioritization logic for issuance on the bus. The prioritization logic prioritizes requests causing a pipeline stall in the microprocessor as highest priority of the plurality of requests.

In another aspect, it is a feature of the present invention to provide a microprocessor. The microprocessor includes a bus clock input that receives a bus clock signal. The bus clock signal has a first frequency for controlling operation of a bus coupling the microprocessor to a system memory. The microprocessor also includes a core clock signal that has a second frequency for controlling operation of core logic in the microprocessor. The second frequency is a multiple of the first frequency. The microprocessor also includes a data cache, coupled to receive the core clock signal, which generates requests to read a cache line on the bus. The requests each have a request type. The microprocessor also includes control logic, coupled to the data cache, which accumulates the requests at the second frequency, prioritizes the accumulated requests based on the request type at the first frequency, and issues a highest priority one of the requests on the bus after the prioritizing. The request type includes at least two of the following request types: a blocking request type, a non-blocking page table data request type, a non-block store allocation request type, and a non-blocking prefetch request type.

In another aspect, it is a feature of the present invention to provide a method for a microprocessor to transfer cache lines from a system memory on a bus coupling the microprocessor and system memory. The bus operates at a bus clock frequency and the microprocessor core logic operates at a core clock frequency. The method includes determining during a core clock cycle whether the core clock cycle is occurring just prior to a next bus clock cycle. The core clock frequency is a multiple of the bus clock frequency. The method also includes prioritizing during the core clock cycle a plurality of bus requests accumulated during previous core clock cycles according to request type if it is determined to be true that the core clock cycle is occurring just prior to a next bus clock cycle. The method also includes issuing during the next bus clock cycle a highest priority one of the plurality of bus requests on the bus after the prioritizing.

An advantage of the present invention is that it takes advantage of the disparity in core and bus logic clock speeds to potentially improve performance by more efficiently using the processor bus and by reducing the clocks per instruction (CPI) of memory access instructions by prioritizing more urgent requests ahead of less urgent requests. Furthermore, by prioritizing bus requests accumulated over an entire bus clock cycle, the present invention achieves more optimal prioritization.

Other features and advantages of the present invention will become apparent upon study of the remaining portions of the specification and drawings.

DETAILED DESCRIPTION

Figure 1:
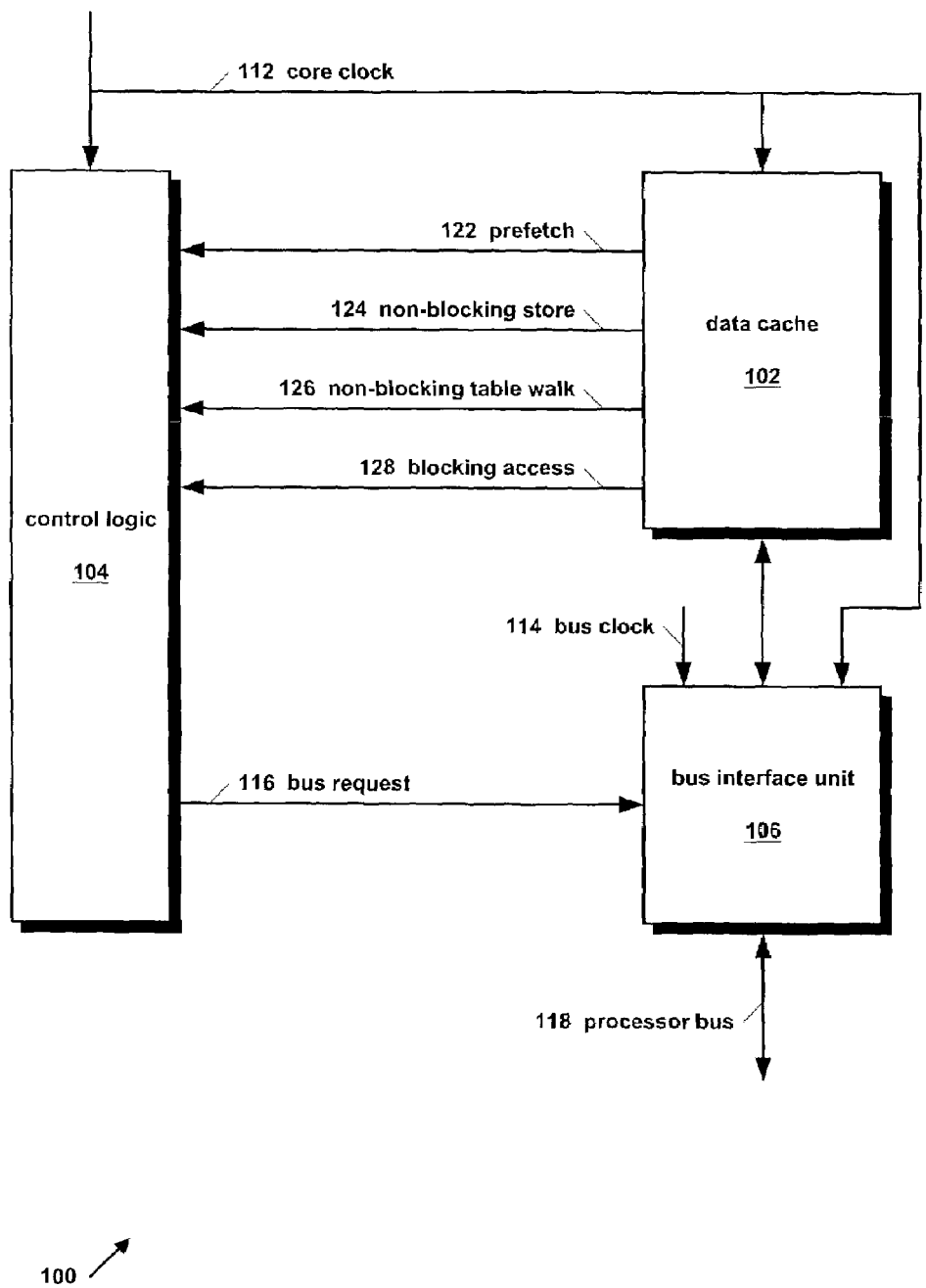
FIG. 1 is a block diagram illustrating a microprocessor 100 according to the present invention.

Referring now to FIG. 1, a block diagram illustrating a microprocessor 100 according to the present invention is shown.

Microprocessor 100 includes a data cache 102. Data cache 102 receives a core clock signal 112 of microprocessor 100. Core clock signal 112 is the clock signal driving the core logic of microprocessor 100. Microprocessor 100 also receives a bus clock signal 114. Bus clock signal 114 is the clock signal associated with a processor bus 118 to which microprocessor 100 is coupled. Processor bus 118 couples microprocessor 100 to other devices in the system, such as system memory and I/O devices. The other devices and microprocessor 100 transfer data between one another on processor bus 118. The core clock signal 112 frequency is a multiple of the bus clock signal 114 frequency.

Data cache 102 comprises arrays of storage elements for storing cache lines and cache tag status associated with the cache lines. Data cache 102 receives from various functional units within microprocessor 100 requests to transfer data to or from data cache 102. The data transfer requests include a memory address. If the cache line containing the data specified by the memory address is present in data cache 102, then data cache 102 transfers the data to or from the requesting functional unit. However, if the cache line containing the specified data is not present in data cache 102, then data cache 102 generates requests to obtain the missing cache line from system memory. The requests to obtain a cache line from system memory are also referred to as a cache line fill or a cache line allocation. Data cache 102 generates four types of cache line fill requests to obtain missing cache lines from system memory.

A first request type is a blocking access type. Data cache 102 generates a blocking access type request on blocking access signal 128. Data cache 102 generates a blocking access type request 128 when the functional unit requesting the data transfer will stall until the data is transferred between the data cache 102 and the functional unit. That is, blocking access type requests 128 are associated with a functional unit in microprocessor 100 that require the data specified by the blocking access type request in order to proceed. Examples of blocking access type requests are load and store operations that cause a stall in a pipeline stage of microprocessor 100.

Another example of a blocking access type request is a blocking page table walk request. A page table walk request is generated when a data cache 102 access memory address misses in a translation lookaside buffer (TLB) of microprocessor 100. Page tables contain data needed by the microprocessor 100 paging unit to perform address translation. The page tables are stored in system memory. However, the TLB caches page table data within microprocessor 100. A page table walk request is a request for page table data missing in the TLB. A blocking page table walk request is a page table walk request that causes a stall in the microprocessor 100 pipeline.

A second request type is a non-blocking table walk access type. Data cache 102 generates a non-blocking table walk access type request on non-blocking table walk access signal 126. A non-blocking page table walk request is a page table walk request that is not causing a stall in the microprocessor 100 pipeline. For example, the non-blocking page table walk request may be associated with a speculative page table walk. An example of a speculative page table walk is as follows. Assume a first load instruction misses in data cache 102 causing a blocking access request 128 to be generated. The first load instruction is followed by a second load instruction that hits in data cache 102. However, even though the second load instruction hits data cache 102, i.e., data cache 102 provides the data to the second load instruction, the second load instruction generates a miss in the TLB, which requires a page table walk request. Hence, although the second load instruction is not a blocking request, i.e., the pipeline is not stalled waiting for the data requested by the second load instruction, data cache 102 anticipates a page table walk request that might cause a pipeline stall, and generates a speculative table walk access request while the first load instruction data is being fetched from system memory.

A third request type is a non-blocking store allocation access type. Data cache 102 generates a non-blocking store allocation access type request on non-blocking store allocation access signal 124. Data cache 102 generates a non-blocking store allocation request 124 in relation to a store to a cacheable region of system memory that has a write-back trait. If the store memory address misses in data cache 102, then data cache 102 issues a bus request to read the missing cache line from system memory into data cache 102. When the cache line is read from system memory and stored into data cache 102, then the data associated with the store is written into data cache 102. In particular, the store allocation request, i.e., the request to read the missing cache line from system memory, is not causing a stall in the microprocessor 100 pipeline.

A fourth request type is a non-blocking prefetch access type. Data cache 102 generates a non-blocking prefetch access type request on non-blocking prefetch access signal 122. Data cache 102 generates a non-blocking prefetch request 122 to prefetch from system memory a cache line specified by a prefetch instruction or speculative prefetch generated by microprocessor 100.

Microprocessor 100 also includes control logic 104 coupled to data cache 102. Control logic 104 receives core clock signal 112. Control logic 104 also receives non-blocking prefetch access signal 122, non-blocking store allocation access signal 124, non-blocking table walk access signal 126, and blocking access signal 128 from data cache 102. Control logic 104 generates a bus request signal 116 to request generation of a transaction on processor bus 118 to obtain cache lines from system memory in response to cache line fill request signals 122–128. Advantageously, control logic 104 accumulates requests generated on request signals 122–128 over a period, or cycle, of bus clock 114, prioritizes the accumulated requests, and generates bus request signal 116 based on the highest priority request just prior to the next bus clock 114, as described in more detail below, rather than simply generating bus requests 116 in program order as in the conventional method. Although control logic 104 and data cache 102 are shown in FIG. 1 as distinct entities, control logic 104 may be incorporated into data cache 102.

Microprocessor 100 also includes a bus interface unit (BIU) 106 coupled to data cache 102 and control logic 104. BIU 106 receives bus request signal 116 from control logic 104. BIU 106 is coupled to processor bus 118. BIU 106 arbitrates for access to processor bus 118 and generates bus transactions on processor bus 118 to transfer data between microprocessor 100 and the other system devices, such as system memory. In particular, BIU 106 generates bus transactions on processor bus 118 to fetch cache lines from system memory based on bus request signal 116. BIU 106 also receives core clock signal 112 and bus clock signal 114.

Figure 2:
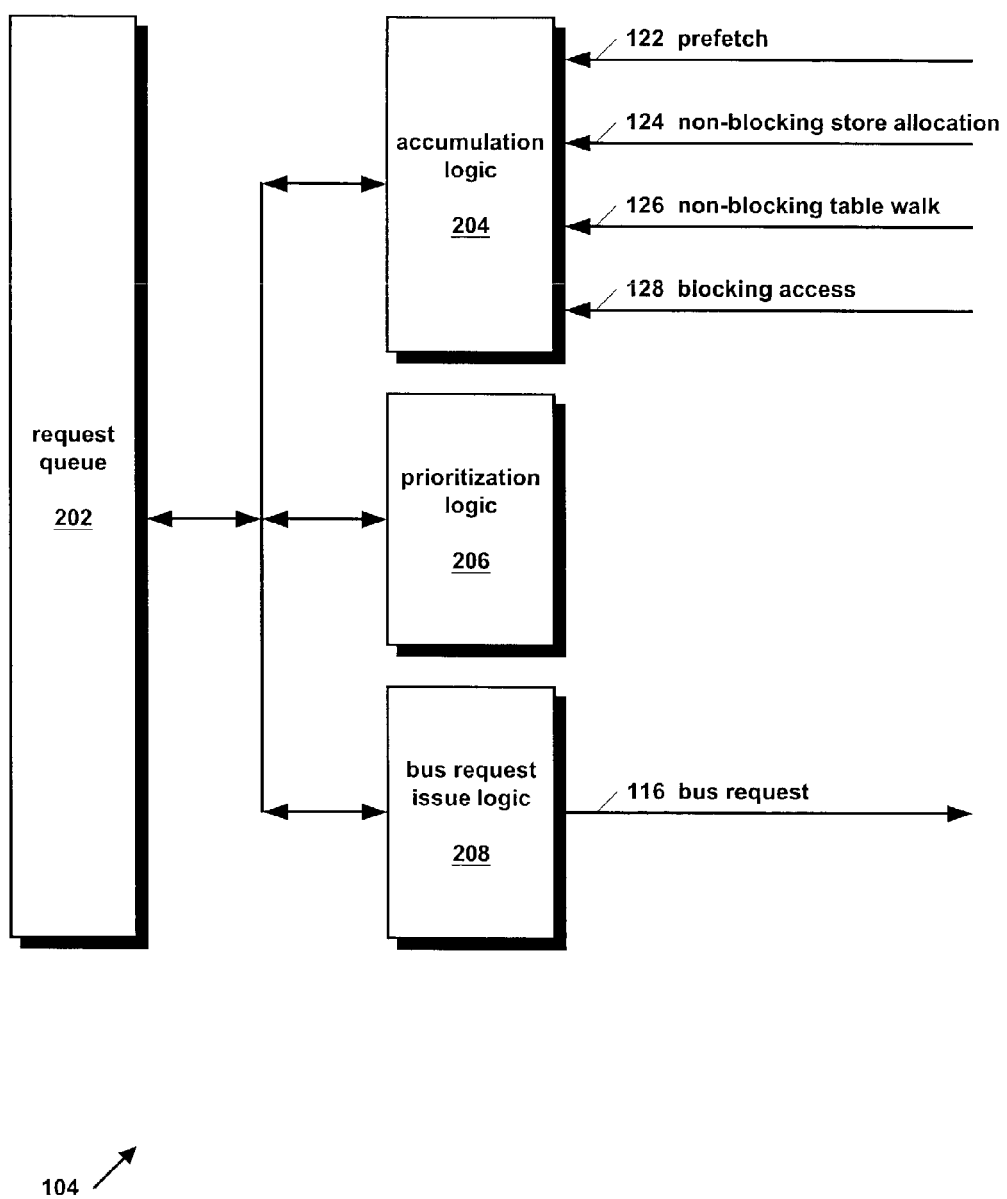
FIG. 2 is a block diagram illustrating the control logic of FIG. 1 according to the present invention.

Referring now to FIG. 2, a block diagram illustrating control logic 104 of FIG. 1 is shown. Control logic 104 includes a request queue 202. Request queue 202 stores requests 122–128 received from data cache 102 of FIG. 1.

Control logic 104 also includes accumulation logic 204 coupled to request queue 202. Accumulation logic 204 receives cache line fill request signals 122–128 from data cache 102. Accumulation logic 204 stores cache line fill requests received on request signals 122–128 in request queue 202 in the order received.

Control logic 104 also includes prioritization logic 206 coupled to request queue 202. Prioritization logic 206 prioritizes the cache line fill requests stored in request queue 202 based on the access type of each request as shown in Table 1 below.

TABLE 1

| Highest | Blocking access |
| Medium | Non-blocking table walk access |
| Lowest | Non-blocking store allocation or prefetch access |

Control logic 104 also includes bus request issue logic 208 coupled to request queue 202. At a core clock 112 cycle prior to the next bus clock 114 cycle, bus request issue logic 208 removes the highest priority cache line fill request stored in request queue 202 and issues bus transaction request 116 to BIU 106 of FIG. 1 on processor bus 118 based on the removed highest priority cache line fill request.

Figure 3:
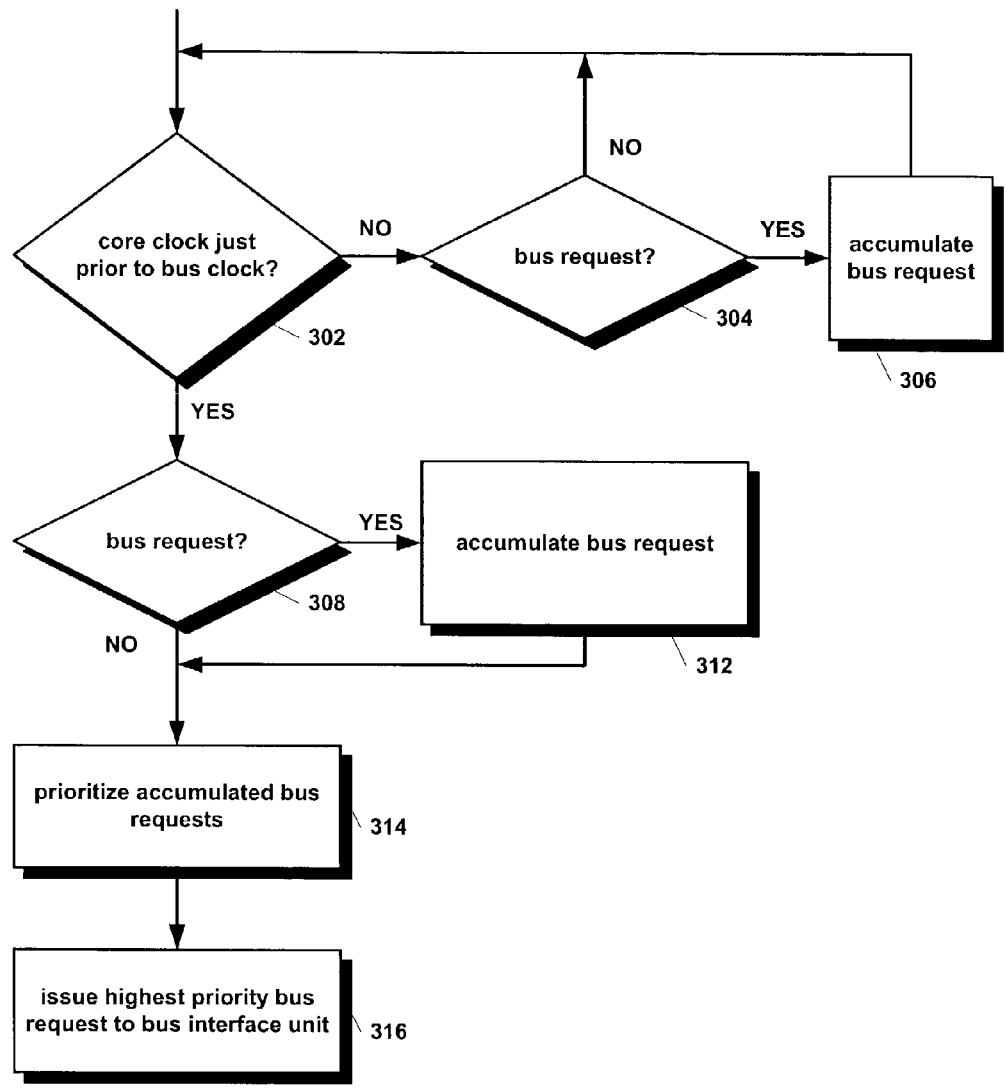
FIG. 3 is a flowchart illustrating operation of the microprocessor of FIG. 1 according to the present invention.

Referring now to FIG. 3, a flowchart illustrating operation of microprocessor 100 of FIG. 1 is shown. Flow begins at decision block 302.

At decision block 302, control logic 104 of FIG. 1 determines whether the current core clock 112 cycle is the core clock 112 cycle just prior to the next bus clock 114 cycle. If not, flow proceeds to decision block 304. Otherwise, flow proceeds to decision block 308.

At decision block 304, accumulation logic 204 of FIG. 2 determines whether data cache 102 is generating a cache line fill request on any of request signals 122–128 of FIG. 1. If not, flow returns to decision block 302. Otherwise, flow proceeds to block 306.

A block 306, accumulation logic 204 accumulates any cache line fill requests on signals 122–128 by storing them at the end of request queue 202. Flow returns to decision block 302.

At decision block 308, accumulation logic 204 determines whether data cache 102 is generating a cache line fill request on any of request signals 122–128. If not, flow proceeds to block 314. Otherwise, flow proceeds to block 312.

A block 312, accumulation logic 204 accumulates any cache line fill requests on signals 122–128 by storing them at the end of request queue 202. Flow proceeds to block 314.

A block 314, prioritization logic 206 of FIG. 2 prioritizes the requests accumulated in request queue 202 according to the priority of Table 1 above. Flow proceeds to block 316.

A block 316, bus request issue logic 208 of FIG. 2 removes the highest priority request in request queue 202, i.e., the request at the front of request queue 202, and generates a request on bus request signal 116 to BIU 106 of FIG. 1 based on the removed request. Flow ends at block 316.

Since the core clock 112 runs at a fixed ratio with the bus clock 114, it is only necessary to prioritize requests accumulated in request queue 202 in the core clock 112 cycle immediately before bus request issue logic 208 generates a bus request 116 to initiate a transaction on processor bus 118. Therefore, to allow as many cache line fill requests as possible to accumulate in the request queue 202 for prioritization, the present invention waits to prioritize requests according to the fixed priority scheme of Table 1 above until the latest core clock 112 cycle before the beginning of the bus clock 114 cycle in which a transaction on the processor bus 118 can be initiated.

Figure 4:
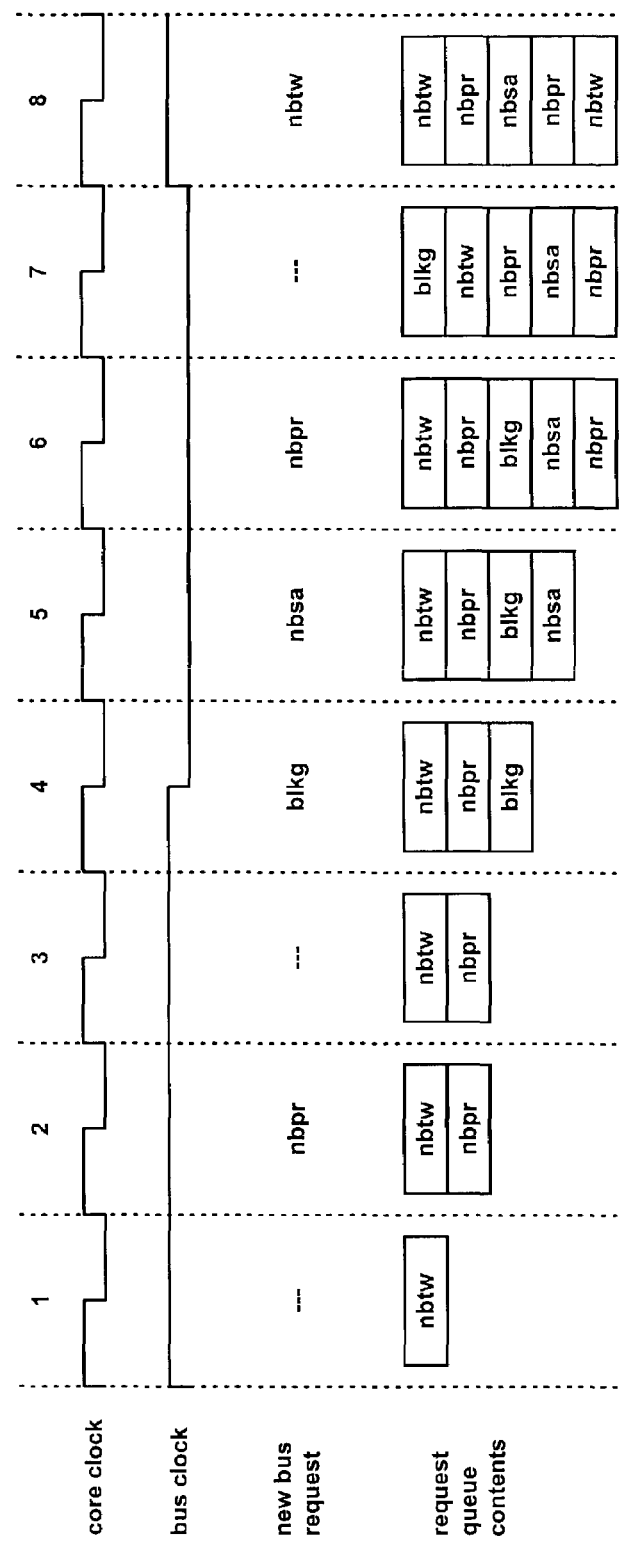
FIG. 4 is a timing diagram illustrating operation of the microprocessor of FIG. 1 according to the present invention.

Referring now to FIG. 4, a timing diagram illustrating operation of microprocessor 100 of FIG. 1 is shown. The timing diagram shows an example of data cache 102 requesting cache line fills and of control logic 104 accumulating, prioritizing, and issuing the highest priority bus request according to the flowchart of FIG. 3. The timing diagram shows eight core clock 112 cycles denoted 1 through 8, and one bus clock 114 cycle. In the example of FIG. 4, the clock multiplier value of microprocessor 100 is 7. That is, the core clock 112 frequency is 7 times the bus clock 114 frequency, as shown. The beginning of core clock cycle 1 coincides with the beginning of a bus clock cycle, as shown.

For each core clock cycle, the timing diagram shows whether a new request is being generated by data cache 102 on cache fill request signals 122–128 of FIG. 1. For each core clock cycle, the timing diagram also shows the contents of request queue 202 of FIG. 2. A new request generated on non-blocking prefetch access signal 122 is denoted "nbpr." A new request generated on non-blocking store allocation access signal 124 is denoted "nbsa." A new request generated on non-blocking table walk access signal 126 is denoted "nbtw." A new request generated on blocking access signal 128 is denoted "blkg." The front of request queue 202 is shown at the top of the queue 202 and the tail of request queue 202 is shown at the bottom of the queue 202 during each core clock cycle in FIG. 4.

During core clock 1, data cache 102 generates no new cache line fill requests, as shown. Request queue 202 stores one request, a non-blocking table walk request (nbtw), remaining from a previous bus clock 114 cycle. That is, the nbtw request had been accumulated during previous core clock cycles and had not been the highest priority request during the previous bus clock 114 cycle.

During core clock 2, data cache 102 generates a non-blocking prefetch request (nbpr) on signal 122, as shown. Accumulation logic 204 stores the nbpr request at the tail of request queue 202 behind the nbtw request, as shown, according to block 306 of FIG. 3.

During core clock 3, data cache 102 generates no new cache line fill requests, as shown. Consequently, request queue 202 remains unchanged.

During core clock 4, data cache 102 generates a blocking request (blkg) on signal 128, as shown. Accumulation logic 204 stores the blkg request at the tail of request queue 202 behind the nbpr request, as shown, according to block 306.

During core clock 5, data cache 102 generates a non-blocking store allocation request (nbsa) on signal 124, as shown. Accumulation logic 204 stores the nbsa request at the tail of request queue 202 behind the blkg request, as shown, according to block 306.

During core clock 6, data cache 102 generates another non-blocking prefetch request (nbpr) on signal 122, as shown. Accumulation logic 204 stores the nbpr request at the tail of request queue 202 behind the nbsa request, as shown, according to block 306.

During core clock 7, data cache 102 generates no new cache line fill requests, as shown. However, because core clock 7 is the core clock 112 cycle prior to the next bus clock 114 cycle, prioritization logic 206 of FIG. 2 prioritizes the requests accumulated in request queue 202 according to the priority specified in Table 1 above, as shown, according to block 314 of FIG. 3. That is, prioritization logic 206 places the blkg request at the front of request queue 202, the nbtw request behind the blkg request, the first nbpr request behind the nbtw request, the nbsa request behind the first nbpr request, and the second nbpr request behind the nbsa request, as shown. Additionally, during core clock 7, after prioritizing the requests as shown, bus request issue logic 208 removes the blkg request, i.e., the highest request, from the front of request queue 202 and issues the blkg request to BIU 106 according to block 316 of FIG. 3.

During core clock 8, a new bus clock 114 cycle begins. Data cache 102 generates a non-blocking table walk request (nbtw) on signal 126, as shown. Accumulation logic 204 stores the nbtw request at the tail of request queue 202 behind the second nbpr request, as shown, according to block 306. As FIG. 4 shows, the first blkg request generated by data cache 102 during core clock 4 is no longer present in request queue 202 since it was removed during core clock 7 for issuance to BIU 106.

Although the present invention and its objects, features, and advantages have been described in detail, other embodiments are encompassed by the invention. For example, although the present invention has been described as accumulating a single new cache line fill request per core clock cycle, multiple requests may be accumulated per core clock cycle, for example in a microprocessor with multiple functional units in the pipeline generating requests concurrently and/or in a multiple pipeline or superscalar processor. Also, although the present invention prioritizes requests according to three priority levels, the present invention is adaptable to different numbers of priority levels. Furthermore, the invention may be used with a processor bus whose protocol does not allow a new bus request to be generated each bus clock, but instead only allows a new bus request to be generated every N bus clocks. Additionally, although the present invention groups four access types into the various priority levels, other access types may be grouped according to the needs of the processor using the present invention. Finally, although the present invention accumulates bus requests and prioritizes them at the core clock just prior to the next bus clock edge, the bus requests could be prioritized some other integer multiple of core clocks, such as two or three, prior to the next bus clock edge.

Those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. A microprocessor, coupled to a bus for transferring data from a memory to the microprocessor, the bus operating at a first clock frequency, and the microprocessor operating at a second clock frequency, wherein the second clock frequency is N times the first clock frequency, the microprocessor comprising:
   a cache memory, for generating requests to read data from the memory on the bus, said requests comprising a plurality of access types;
   control logic, coupled to said cache memory, for receiving and accumulating said requests from said cache memory for approximately N cycles of the second clock frequency, and prioritizing said accumulated requests according to said plurality of access types; and
   a bus interface unit, coupled to said control logic, for receiving from said control logic after said approximately N cycles of the second clock frequency a highest priority one of said prioritized requests, wherein said plurality of access types includes a blocking access type request, wherein said control logic prioritizes blocking access type requests as highest priority of said access types.

2. The microprocessor of claim 1, wherein said bus interface unit is configured to issue said highest priority request on the bus in response to reception thereof.

3. The microprocessor of claim 1, wherein said blocking access type request is associated with a functional unit in the microprocessor requiring data specified by said blocking access type request in order to proceed.

4. The microprocessor of claim 1, wherein said blocking access type request comprises a request generated by an operation causing a pipeline stall in the microprocessor while waiting for data associated with said blocking access type request.

5. The microprocessor of claim 1, wherein said plurality of access types includes a non-blocking page table walk access type request, wherein said control logic prioritizes non-blocking page table walk access type requests after said blocking access type requests.

6. The microprocessor of claim 5, wherein said non-blocking page table walk access type request comprises a request to read page table data from the memory on the bus due to a translation lookaside buffer miss.

7. The microprocessor of claim 5, wherein said plurality of access types includes a non-blocking store allocation access type request, wherein said control logic prioritizes non-blocking store allocation access type requests after said blocking access type requests and said non-blocking page table walk access type requests.

8. The microprocessor of claim 7, wherein said non-blocking store allocation access type request comprises a request to read a cache line from the memory on the bus due to a store miss in said cache memory to a write-back memory region.

9. The microprocessor of claim 5, wherein said plurality of access types includes a prefetch access type request, wherein said control logic prioritizes prefetch access type requests after said blocking access type requests and said non-blocking page table walk access type requests.

10. The microprocessor of claim 9, wherein said prefetch access type request comprises a request to read a cache line specified by a prefetch instruction.

11. The microprocessor of claim 9, wherein said prefetch access type request comprises a request to read a cache line speculatively generated by the microprocessor.

12. The microprocessor of claim 1, wherein N comprises an integer greater than one.

13. The microprocessor of claim 1, wherein N comprises a fraction greater than two.

14. A data cache, in a microprocessor coupled to a system memory by a bus, the microprocessor core logic operating according to a core clock, the bus operating according to a bus clock, the data cache comprising:
  a request queue, for storing a plurality of requests to fill a cache line from the system memory on the bus, said requests comprising a plurality of types;
  request accumulation logic, coupled to said request queue, for storing said plurality of requests into said request queue in an order received during core clock cycles;
  prioritization logic, coupled to said request queue, for prioritizing said plurality of requests based on said plurality of types during a core clock cycle just prior to a next bus clock cycle; and
  bus request issue logic, coupled to said request queue, for removing from said request queue a highest priority of said plurality of requests prioritized by said prioritization logic for issuance on the bus, wherein said prioritization logic prioritizes requests causing a pipeline stall in the microprocessor as highest priority of said plurality of requests.

15. The data cache of claim 14, wherein the core clock frequency is a multiple of the bus clock frequency.

16. The data cache of claim 14, wherein said prioritization logic prioritizes requests not causing a pipeline stall in the microprocessor as lower priority of said plurality of requests than said requests causing a pipeline stall.

17. The data cache of claim 16, wherein said requests not causing a pipeline stall in the microprocessor comprise requests to fill a cache line from the system memory due to a translation lookaside buffer miss.

18. The data cache of claim 17, wherein said requests not causing a pipeline stall in the microprocessor comprise requests to fill a cache line from the system memory due to a store miss to a write-back cacheable region.

19. The data cache of claim 18, wherein said prioritization logic prioritizes requests to fill a cache line from the system memory due to a store miss to a write-back cacheable region lower than said requests to fetch a cache line from the system memory due to a translation lookaside buffer miss.

20. The data cache of claim 17, wherein said requests not causing a pipeline stall in the microprocessor comprise requests to fill a cache line from the system memory due to a prefetch operation.

21. The data cache of claim 20, wherein said prioritization logic prioritizes requests to fill a cache line from the system memory due to a prefetch operation lower than said requests to fetch a cache line from the system memory due to a translation lookaside buffer miss.

22. A microprocessor, comprising:
  a bus clock input, for receiving a bus clock signal, said bus clock signal having a first frequency for controlling operation of a bus coupling the microprocessor to a system memory;
  a core clock signal, having a second frequency, for controlling operation of core logic in the microprocessor, said second frequency being a multiple of said first frequency;
  a data cache, coupled to receive said core clock signal, for generating requests to read a cache line on said bus, said requests each having a request type; and
  control logic, coupled to said data cache, for accumulating said requests at said second frequency, for prioritizing said accumulated requests based on said request type at said first frequency, and for issuing a highest priority one of said requests on said bus after said prioritizing, wherein said request type includes at least two of the following request types: a blocking request type, a non-blocking page table data request type, a non-block store allocation request type wherein said blocking request type is highest priority, and a non-blocking prefetch request type.

23. The microprocessor of claim 22, wherein said non-blocking page table data request type is next highest priority, and said non-block store allocation request type and a non-blocking prefetch request type are next highest priority.

24. A method for a microprocessor to transfer cache lines from a system memory on a bus coupling the microprocessor and system memory, the bus operating at a bus clock frequency and the microprocessor core logic operating at a core clock frequency, the method comprising:
  determining during a core clock cycle whether said core clock cycle is occurring just prior to a next bus clock cycle, wherein the core clock frequency is a multiple of the bus clock frequency;
  prioritizing during said core clock cycle a plurality of bus requests accumulated during previous core clock cycles according to request type, if said determining is true; and
  issuing during said next bus clock cycle a highest priority one of said plurality of bus requests on the bus after said prioritizing.

25. The method of claim 24, wherein said plurality of bus requests comprise requests to transfer a cache line of data from the system memory to a data cache in the microprocessor on the bus.

26. The method of claim 24, wherein said prioritizing comprises prioritizing ones of said plurality of bus requests of a blocking request type at highest priority.

27. The method of claim 26, wherein said blocking request type comprises a request causing a pipeline stall in the microprocessor.

28. The method of claim 26, wherein said prioritizing comprises prioritizing ones of said plurality of bus requests of a non-blocking request type at lower priority than said blocking request type.

29. The method of claim 28, wherein said non-blocking request type comprises a request not causing a pipeline stall in the microprocessor.

30. The method of claim 29, wherein said non-blocking request type comprises a request to transfer page table data from the system memory to the microprocessor on the bus.

31. The method of claim 30, wherein said non-blocking request type comprises a request to transfer a cache line associated with a store miss in a data cache of the microprocessor from the system memory to said data cache on the bus.

32. The method of claim 31, wherein said prioritizing comprises prioritizing said request to transfer page table data at higher priority than said request to transfer said cache line associated with said store miss.

33. The method of claim 30, wherein said non-blocking request type comprises a request to prefetch a cache line from the system memory to a data cache in the microprocessor on the bus.

34. The method of claim 33, wherein said prioritizing comprises prioritizing said request to transfer page table data at higher priority than said request to prefetch said cache line.

* * * * *